United States Patent [19]

Mortimer et al.

[11] 4,175,795
[45] Nov. 27, 1979

[54] FLUID-PRESSURE OPERATED ANTI-SKID BRAKING SYSTEM FOR VEHICLES

[75] Inventors: Ivan Mortimer, Solihull; Charles T. Layton, Birmingham, both of England

[73] Assignee: Girling Limited, Birmingham, England

[21] Appl. No.: 922,331

[22] Filed: Jul. 6, 1978

[30] Foreign Application Priority Data

Jul. 9, 1977 [GB] United Kingdom ............... 28885/77

[51] Int. Cl.² .............................................. B60T 8/02
[52] U.S. Cl. ..................................... 303/118; 303/40; 303/113
[58] Field of Search ................... 188/181 A; 303/113, 303/115, 118, 119, 40

[56] References Cited

U.S. PATENT DOCUMENTS

| | | | |
|---|---|---|---|
| 3,857,614 | 12/1974 | Kurichh | 303/118 |
| 3,929,383 | 12/1975 | Urban et al. | 303/118 |
| 3,941,428 | 3/1976 | Rothwell et al. | 303/118 |
| 3,950,035 | 4/1976 | Tribe | 303/118 |

*Primary Examiner*—Duane A. Reger
*Attorney, Agent, or Firm*—Scrivener, Parker, Scrivener & Clarke

[57] ABSTRACT

In a fluid-pressure operated anti-skid braking system operation of a brake-applying relay valve is controlled by control pressure in an application chamber. A memory chamber is connected to the application chamber through a one-way valve and an orifice permits pressure in the memory chamber to decay into the application chamber when the pressure in the application chamber reduces. Re-application of the brakes following a skid is controlled by closure of a latch valve which permits only a restricted flow of control pressure into the application chamber. This is sufficient to re-apply the brakes rapidly in a first stage until the pressure in the application chamber becomes equal to that of the decayed pressure in the memory chamber, whereafter brake re-application continues at a slower rate since the restricted flow of control pressure has also to increase the pressure in the memory chamber.

9 Claims, 6 Drawing Figures

FLUID-PRESSURE OPERATED ANTI-SKID BRAKING SYSTEM FOR VEHICLES

SPECIFIC DESCRIPTION

This invention relates to improvements in fluid-pressure operated anti-skid braking systems for vehicles of the kind in which operating fluid from a supply for actuating a wheel brake is supplied to the brake through fluid-flow control valve means interposed in the line between the supply and the brake, and deceleration responsive means responsive to a skid signal are incorporated for operating the valve means to relieve the brake pressure of the fluid supplied to the brake at a skid point when the skid signal is excessive and exceeds a predetermined value, a memory chamber being incorporated for storing a memory pressure dependant upon the brake pressure occuring at the skid point to provide a datum or changeover point between first and second successive stages of brake re-application, the first stage comprising the re-application of the operating fluid from the supply until a pressure less than the pressure at the skid point is attained at the changeover point, and the second stage comprising the continued re-application of the supply of operating fluid but at a reduced rate of pressure increase.

An anti-skid braking system of the kind set forth is disclosed in our patent application No. 52265/76. In that patent application the control valve means comprises a relay valve operable in response to a control pressure in an application chamber and, until the skid point is reached, the control pressure comprises the operator-controlled pressure which is supplied through an open latch valve to both the application chamber and the memory and, at the skid point, the latch valve closes and remains shut during brake re-application in a common cycle so that the application chamber can be exposed only to the pressure of the memory, or to the pressure of the memory suitably augmented by the original operator-controlled pressure, but supplied at a reduced rate as determined by a restrictor.

According to our invention an anti-skid braking system of the kind set forth comprises a relay valve operable in response to a control pressure in an application chamber, a supply passage through which the control pressure is supplied to the application chamber from operator-controlled means, a latch valve disposed in the supply passage, a connection between the supply passage and the memory chamber downstream of the latch valve, a one-way valve permitting flow through the connection only into the memory chamber, the latch valve being movable between an open position in which the control pressure can be supplied to the application chamber and to the memory chamber through the supply passage and a closed position, and a restricted passage through which the control pressure can be supplied to the application chamber and to the memory chamber at least when the latch valve is closed, in which the deceleration responsive means includes a valve member movable between a first position in which the application chamber is isolated from an exhaust port and the supply passage is in communication with both the application chamber and the memory chamber, and a second position at the skid point in which the supply passage is isolated from the application chamber and the application chamber is exhausted to the exhaust port so that braking is relieved, skid correction returning the valve member to the first position with the latch valve closing so that brake re-application can occur rapidly during the first stage with the control pressure supplied to the application chamber through the restricted passage until the changeover point is reached at which the pressure in the application chamber equals the pressure in the memory chamber, whereafter re-application in the second stage continues at a reduced rate since the control pressure supplied through the restricted passage has also to increase the pressure of the memory chamber.

Arranging for the application chamber to be relatively small provides a rapid brake re-application in the first stage following correction of a skid in a single brake applying cycle, and the rate of continued re-application in the second stage will depend upon the volume of the memory or, more precisely, upon the effective increase in the total volume which the operator-controlled pressure has to increase.

Preferably the one-way valve is disposed between the application chamber and the memory chamber.

A restricted orifice may be provided between the memory chamber and the exhaust port through which the pressure in the memory chamber can decay, when the valve member is in the second position. This ensures that the changeover point is reached when the pressure in the application chamber equals the reduced pressure then present in the memory chamber.

The restricted passage may comprise a separate passage by-passing the latch valve so that, when the valve member returns to the first position following skid correction, the latch valve closes due to reduction in the pressure on one side of its valve member, which pressure is supplied to the application chamber with the pressure through the restricted passage.

Preferably, however, the latch valve itself is connected into the supply passage and the restricted passage comprises a gap incorporated in its valve member to permit a restricted flow through the latch valve when the latch valve has closed following a skid.

Some embodiments of our invention are illustrated in the accompanying drawings in which.

Figure 1:
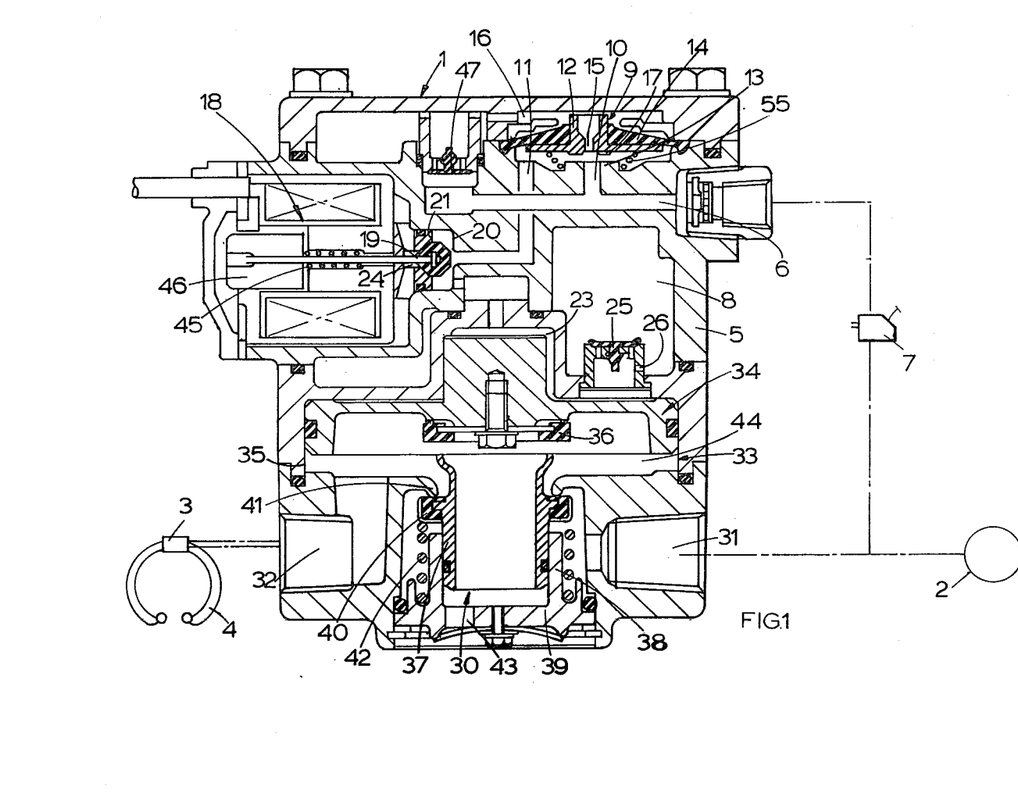
FIG. 1 is a transverse section through a skid control unit in a pneumatically-operable braking system.

In the anti-skid braking system illustrated in FIG. 1 of the drawings a skid control unit 1 is adapted to regulate the supply of pneumatic fluid from a source 2 to an actuator 3 of a brake 4 in accordance with the deceleration of the wheel braked by the brake 4.

As illustrated the unit 1 comprises a housing 5 having a first inlet supply passage 6 connected to a pedal-operated treadle air valve 7 for controlling a branch supply from the source 2, a memory chamber 8, and a latch valve 9 which controls communication between spaced ports 10 and 11 in the passage 6. The latch valve 9 comprises a valve member 12 for engagement with a seating 13 surrounding the port, and carried by a flexible diaphragm 14. The valve member 12 is provided with a bleed orifice 15 providing a restricted flow into a chamber 16 above the diaphragm 14 and extending transversely, even when the latch valve 9 is shut, to cut-off flow through the supply passage 6 except through a restricted passage defined by a gap 17 in the valve member 12. The chamber 16 also communicates with the supply passage at a position downstream of the port 10, through a one-way valve 47.

A solenoid-operated valve 18 responsive to an electrical signal from means responsive to deceleration of a braked wheel incorporates a valve member 19 engageable alternatively with first and second spaced seatings 20 and 21. The first seating 20 is disposed between the supply passage 6 and an application chamber 23, and the second is disposed between the application chamber 23 and an exhaust port 24. The volume of the application chamber 23 is small in comparison with that of the memory chamber 8. When the solenoid is de-energised, during normal braking, the valve member 19 engages with the seating 21 so that the supply passage 6 is in communication with the re-application chamber 23. A light spring 55 acts on the valve member 12 to hold the latch valve 9 open. Thus operator-controlled pressure will be supplied to the application chamber 23 through the latch valve 9 and the supply passage 6, and the latch valve 9 will remain open since equal pressures are applied to opposite sides of the diaphragm 14.

A one-way valve 25 permits flow only in one direction from the application chamber 23 into the memory chamber 8 so that the memory chamber 8 is normally maintained at the same pressure as the application chamber 23, and an orifice 26 permits flow between the two chambers 23 and 8 in both directions.

The housing 1 also accomodates fluid-flow control means comprising a relay valve 30 for controlling communication between an inlet supply passage 31, which is connected to the source 2, and an outlet supply passage 32 which is connected to the actuator 3 of the brake 4.

The relay valve 30 comprises a bore 33 of stepped outline and a piston 34 defining the lower end of the application chamber 23 works in the inner portion 35 of the bore 33 which is of greater diameter. A valve head 36 on the face of the piston 34 which is opposite the chamber 23 is engageable with the inner end of a sleeve 37 and the sleeve 37 is guided in an inwardly projecting axial skirt 38 of a closure member 39 for the outer end of the bore 33 which is of smaller diameter. The sleeve 37 has a radial flange 40 comprising a valve head which is urged inwardly towards a shoulder 41 at the step at the change in diameter by means of a compression spring 42, and the closure member 39 is provided with at least one exhaust port 43 communicating with the interior of the sleeve. The inlet passage 31 is located on the same side of the seating 41 as the valve head 40 and the outlet passage 32 is located on the opposite side thereof. Thus, in the inoperative position shown, communication between the inlet passage 31 and a chamber 44 in the bore 33 to which the side of the piston 34 carrying the valve head 36 is exposed is cut-off by the engagement of the head 40 with the seating 41, and that chamber 44 is exhausted to atmosphere through the port 43 since the head 36 is spaced from the sleeve 37.

In an inoperative position, and when the brakes are to be applied, the valve member 19 is held in engagement with the seating 21 by means of a spring 45 which acts on an armature 46 carrying the valve member 19. This isolates the application chamber 23 from atmosphere. Also the latch valve 9 is held in the open position by the spring 55. Control pressure from the treadle valve 7 is supplied from the inlet supply passage 6 to the application chamber 23 of the relay valve 30 through the latch valve 9, which remains in the open position since equal pressures are applied to opposite sides of the diaphragm 14. The pressure in the application chamber 14 also enters the memory chamber 8 through the one-way valve 25 so that the pressure in the memory chamber 8 is equal to the pressure in the application chamber 23. The pressure in the application chamber 23 acts on the piston 34 to urge it downwardly with the result that the valve head 36 engages with the upper end of the sleeve 37 to isolate the chamber 44 from atmosphere. Thereafter further movement of the piston 34 in the same direction moves the flange 40 away from the seating 41 so that the brakes are operated by pressure from the inlet passage 31 which passes to the outlet passage 32 through the chamber 44.

When the deceleration of the wheel braked by the brake 4 exceeds a predetermined value the solenoid-operated valve 18 is energised by a skid signal and the armature 46 is urged inwardly against the loading in the spring 45 to cause the valve member to engage with the seating 20. This cuts off communication between the supply passage 6 and the application chamber 23. The application chamber 23 is, in addition, exhausted to atmosphere through the exhaust port 24 although the latch valve 9 remains in the open position.

The reduction in pressure in the application chamber 23 permits the piston 34 to move relatively away from the closure member 39 with the sleeve 37 also moving away from the closure member 39 under the influence of the spring 42 until the flange 40 engages with the seating 41 to isolate the inlet passage 31 from the outlet passage 32. Further movement of the piston 34 in the same direction moves the head 36 away from the sleeve 37 so that air under pressure in the chamber 44 is exhausted to atmosphere through the port 43.

The pressure in the memory chamber 18 also reduces through the application chamber 23 and the exhaust port 24, but at a rate of decay controlled by the metered orifice 26. No flow can take place through the one-way valve 25 in that direction.

After the skid condition has been corrected the solenoid is de-energised so that the valve member 19 re-engages the seating 21 to isolate the application chamber 23 from atmosphere and to open the supply passage 6 to the application chamber 23. This reduces the pressure acting on the underside of the diaphragm 14 so that the latch valve 9 closes against the force in the spring 55.

Pressure in the application chamber 23 is rapidly increased by the flow through the restricted passage defined by the gap 17 to provide a restricted flow with the latch valve 4 shut. The relay valve 30 is operated as described above in response to pressure in the application chamber 23 to re-apply the brakes.

The pressure in the application chamber 23 rises rapidly during the first stage of brake re-application and until the changeover point is reached at which that pressure equals the pressure then present in the memory chamber 8, and to which it has decayed by bleed through the orifice 26.

Thereafter the control pressure in the chamber 14 can still increase, but at a slower rate, since the restricted flow through the gap 17 has also to increase, at the same rate, the pressure in the memory chamber 8. Thus the brakes are re-applied in a second stage but at a reduced rate of pressure increase. This continues through the remainder of the brake re-application in a common cycle following a skid condition, until the end of that brake applying sequence, or until a further skid condition is reached, whereupon the sequence of brake release and re-application described above is repeated.

Upon release of the treadle valve the components restored to the position shown in the drawings with all chambers exhausted to atmosphere. The one-way valve 47 opens to exhaust pressure from the chamber 16 to ensure that the latch valve 4 opens rapidly.

Figure 2:
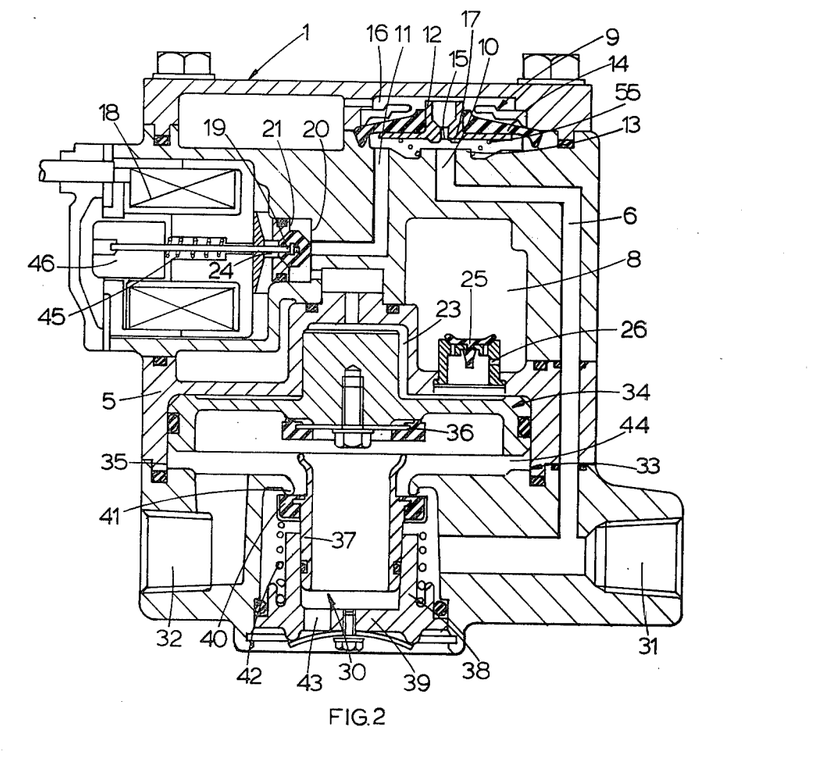
FIG. 2 is a transverse section through a skid conttrol unit similar to FIG. 1, but showing a modification.
Figure 3:
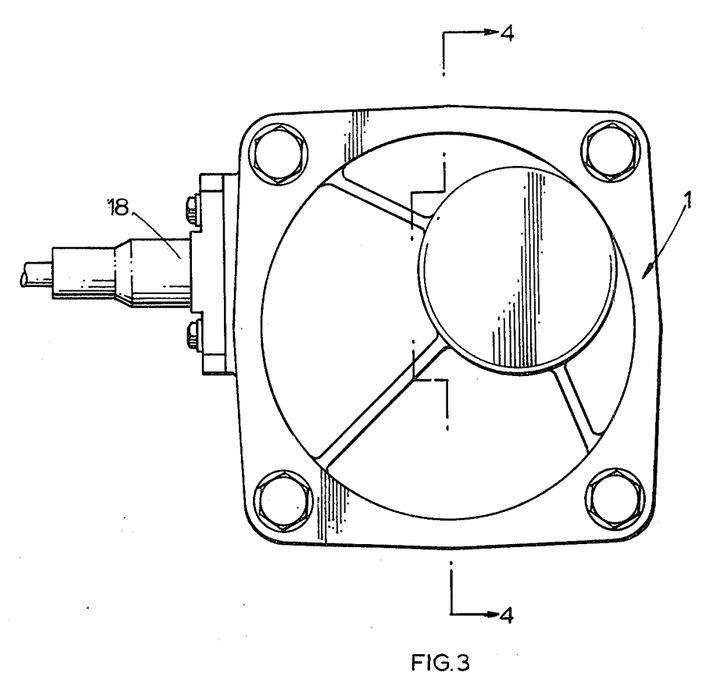
FIG. 3 is a plan view of a further skid control unit.
Figure 4:
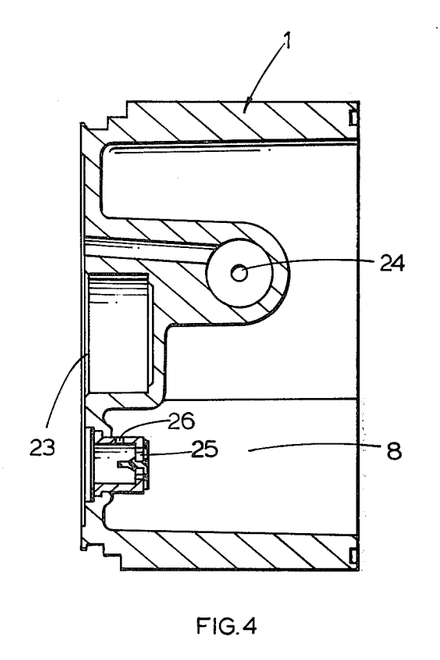
FIG. 4 is a transverse section on the line 4—4 of FIG. 1.
Figure 5:
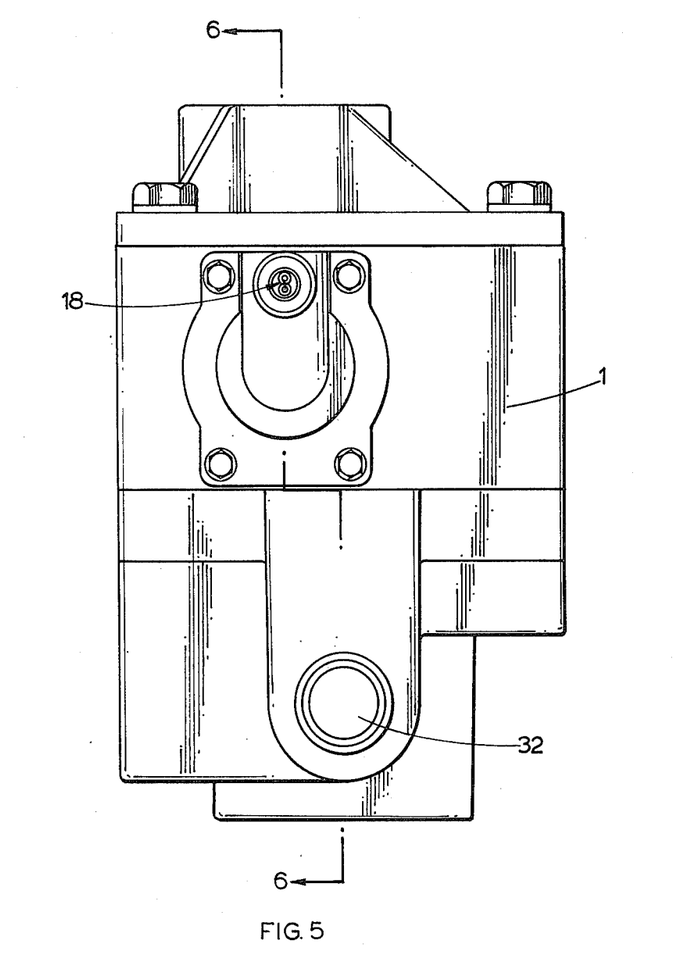
FIG. 5 is a side view of the unit.
Figure 6:
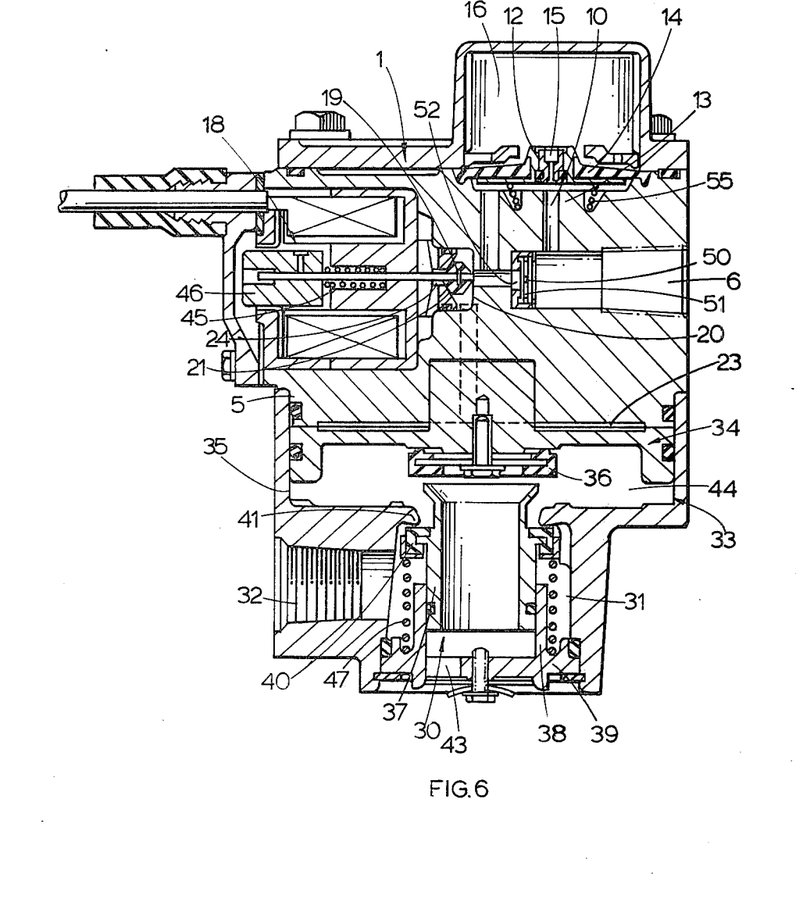
FIG. 6 is a section on the line 6—6 of FIG. 5.

In the construction illustrated in FIG. 2 of the drawings the supply passage 6 is connected into the inlet supply passage 31 internally of the housing, and the treadle valve itself is connected to the supply passage 31. The one-way valve 47 is also omitted.

In the construction of FIG. 2 release of the treadle valve at the termination of a brake application connects the inlet supply passage 31 to exhaust. This exhausts the pressure in the supply passage 6 and the pressure in the chamber 44, to reduce the pressure applied to the brakes from the outlet passage 32. Reduction in the pressure in the supply passage 6 causes the latch valve 9 to close, since a higher pressure is present in the chamber 16. Pressure is therefore trapped in the application chamber 23 to hold the relay valve 30 in the open position with the head 36 in engagement with the upper end of the sleeve 37, and the flange 40 spaced from the seating 41. The chamber 44 is therefore isolated from the exhaust port 43.

The pressure in the application chamber 23 bleeds into the passage 6 through the restricted passage defined by the gap 17. Pressure also bleeds into the supply passage 6 through the bleed orifice 15 in the valve member 12 of the latch valve 9 until the pressures on opposite sides of the diaphragm 14 approach each other to an extent sufficient for the spring 55 to open the latch valve 9. When that occurs the pressure in the application chamber 23 is rapidly exhausted and, as as described above with reference to FIG. 1, the components are returned to the positions shown in FIG. 2 of the drawings with the relay valve 30 opening to exhaust any remaining pressure in the brakes to atmosphere through the exhaust port 43.

Omitting the one-way valve 47 ensures that during brake re-application in a common cycle following skid correction there is no tendency for the latch valve 9 to open prematurely due to reduction in the pressure in the chamber 16 above the diaphragm. This otherwise might occur due to the pressure gradient between the source 2 and the port 10 when the pressure in the application chamber 23 is being increased by flow through the restricted passage defined by the gap 17.

The construction and operation of the unit shown in FIG. 2 is otherwise the same as that of FIG. 1 and corresponding reference numerals have been applied to corresponding parts.

In the skid control unit illustrated in FIGS. 3 to 6 the valve member 12 of the latch valve 9 has a flat face for engagement with the seating 13, and the restricted passage which is operative when the latch valve 9 is shut comprises an orifice 50 in a member 51 which is located in a by-pass passage 52 which by-passes the latch valve 9. Thus, after the latch valve 9 closes, upon brake re-application the control pressure is supplied to the application chamber 23 through the orifice 50 in the by-pass passage 52 at a reduced rate of flow.

The member 51 is in the form of a washer of star-outline having a series of serrations around its peripheral edge to provide a desired flow when the washer 51 is blown away from a seating in response to reverse flow into the supply passage 6 when the brakes are released.

The construction and operation of the control unit of FIGS. 3 to 6 is otherwise the same as that of FIG. 2 described above and corresponding reference numerals have again been applied to corresponding parts.

We claim:

1. A fluid-pressure operated anti-skid braking system for vehicles comprising a brake for braking a wheel, a supply of operating fluid under pressure for operating said brake, fluid-flow control valve means through which fluid from said supply is supplied to said brake, deceleration responsive means responsive to a skid signal for operating said valve means to relieve the brake pressure of fluid supplied to said brake at a skid point when the deceleration of said wheel is excessive and exceeds a predetermined value, a memory chamber for storing a memory pressure dependent upon the brake pressure occurring at said skid point to provide a changeover point between first and second stages of brake re-application, said first stage comprising the re-application of said operating fluid from said supply until a pressure less than the pressure of said skid point is attained at said changeover point, and said second stage comprising the continued re-application of said operating fluid but at a reduced rate of pressure increase, operator-controlled means for providing a control pressure, means defining an application chamber to which said control pressure is supplied, a relay valve operable in response to control pressure in said application chamber for controlling said brake pressure, a supply passage through which said control pressure is supplied to said application chamber from said operator-controlled means, a latch valve disposed in said supply passage, a connection between said supply passage and said memory chamber downstream of said latch valve, and a one-way valve permitting flow through said connection only into said memory chamber, said latch valve being movable between an open position in which said control pressure can be supplied to said application chamber and to said memory chamber through said supply passage and a closed position, and a restricted passage through which said control pressure can be supplied to said application chamber and to said memory chamber at least when said latch valve is closed, wherein said deceleration responsive means includes a valve member movable between a first position in which said application chamber is isolated from an exhaust port and said supply passage is in communication with both said application chamber and said memory chamber and a second position at the skid point in which said supply passage is isolated from said application chamber and said memory chamber, and said application chamber and said supply passage at least on the downstream side of said valve member are exhausted to said exhaust port so that braking is relieved, skid correction returning said valve member to said first position with said latch valve closing so that brake re-application can occur rapidly during the first stage with said control pressure supplied to said application chamber through said restricted passage until said changeover point is reached at which pressure in said application chamber equals said memory pressure in said memory chamber, whereafter re-application in the second stage continues at a reduced rate since said control pressure supplied through said restricted passage has also to increase said pressure of said memory chamber.

2. An anti-skid braking system as claimed in claim 1, wherein the volume of said application chamber is small in comparison with that of said memory chamber.

3. An anti-skid braking system as claimed in claim 1, wherein said one-way valve is located between said application chamber and said memory chamber.

4. An anti-skid braking system as claimed in claim 1, wherein a restricted orifice is provided between said memory chamber and said exhaust port through which the pressure in said memory chamber can decay when said valve member is in said second position whereby, during brake re-application, said changeover point is reached when said pressure in said application chamber equals the reduced pressure then present in said memory chamber.

5. An anti-skid braking system as claimed in claim 4, wherein said restricted orifice is located between said memory chamber and said application chamber.

6. An anti-skid braking system as claimed in claim 1, wherein said restricted passage comprises a by-pass passage which by-passes said latch valve.

7. An anti-skid braking system as claimed in claim 6, wherein said by-pass passage is restricted by means of an orifice incorporated in it.

8. An anti-skid braking system as claimed in claim 1, wherein said latch valve itself is connected into said supply passage, and said restricted passage comprises a restricted flow path defined between a valve member of said latch valve and a seating when said valve member is in engagement with said seating.

9. An anti-skid braking system as claimed in claim 8, wherein said restricted passage comprises a gap in said valve member of said latch valve.

* * * * *

UNITED STATES PATENT AND TRADEMARK OFFICE
CERTIFICATE OF CORRECTION

PATENT NO. : 4,175,795
DATED : November 27, 1979
INVENTOR(S) : Ivan Mortimer and Charles T. Layton It is certified that error appears in the above-identified patent and that said Letters Patent are hereby corrected as shown below:

Column 1, lines 11 and 12, delete "deceleration responsive".

Claim 1, line 6, delete "deceleration responsive".

Signed and Sealed this

Nineteenth Day of February 1980

[SEAL]

Attest:

SIDNEY A. DIAMOND

*Attesting Officer*  *Commissioner of Patents and Trademarks*

UNITED STATES PATENT AND TRADEMARK OFFICE
CERTIFICATE OF CORRECTION

PATENT NO. : 4,175,795
DATED : November 27, 1979
INVENTOR(S) : Ivan Mortimer and Charles T. Layton It is certified that error appears in the above-identified patent and that said Letters Patent are hereby corrected as shown below:

Column 1, line 59, before "means" delete "deceleration responsive"; after "means" insert --responsive to said skid signal--.

Claim 1, column 6, line 47, before "means" delete "deceleration responsive"; after "means" insert --responsive to said skid signal--.

Signed and Sealed this

Sixth Day of May 1980

[SEAL]

Attest:

SIDNEY A. DIAMOND

Attesting Officer — Commissioner of Patents and Trademarks